United States Patent
Kuribayashi

(10) Patent No.: US 7,613,197 B2
(45) Date of Patent: Nov. 3, 2009

(54) MULTI-PROCESSOR SYSTEM AND MESSAGE TRANSFERRING METHOD IN THE SAME

(75) Inventor: Shinya Kuribayashi, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 521 days.

(21) Appl. No.: 11/406,435

(22) Filed: Apr. 19, 2006

(65) Prior Publication Data
US 2006/0242257 A1    Oct. 26, 2006

(30) Foreign Application Priority Data
Apr. 20, 2005    (JP) .............................. 2005-121864

(51) Int. Cl.
*H04L 12/28*    (2006.01)
(52) U.S. Cl. .................. 370/412; 709/207; 709/215
(58) Field of Classification Search .................. 709/207, 709/215; 370/422
See application file for complete search history.

(56) References Cited

U.S. PATENT DOCUMENTS

| | | | |
|---|---|---|---|
| 4,914,570 A * | 4/1990 | Peacock ..................... | 718/106 |
| 5,521,916 A | 5/1996 | Choudhury et al. | |
| 5,592,671 A * | 1/1997 | Hirayama ................... | 718/104 |
| 5,617,537 A * | 4/1997 | Yamada et al. ............. | 709/214 |
| 6,243,382 B1 * | 6/2001 | O'Neill et al. ......... | 370/395.52 |
| 6,636,949 B2 | 10/2003 | Barroso et al. | |
| 7,035,908 B1 * | 4/2006 | Williams et al. ............ | 709/214 |
| 2003/0169757 A1 * | 9/2003 | LaVigne et al. ............. | 370/413 |

FOREIGN PATENT DOCUMENTS

| | | |
|---|---|---|
| JP | 03-046052 | 2/1991 |
| JP | 03-174645 | 7/1991 |
| JP | 04-295951 | 10/1992 |
| JP | 6-044191 | 2/1994 |
| JP | 06-068040 | 3/1994 |
| JP | 2004-362476 A | 12/2004 |

\* cited by examiner

*Primary Examiner*—Chirag G Shah
*Assistant Examiner*—Otis L Thompson, Jr.
(74) *Attorney, Agent, or Firm*—Foley & Lardner LLP

(57) ABSTRACT

A multi-processor system includes a plurality of processors; and a memory section connected with the plurality of processors and configured to store a message transmitted from each of the plurality of processor to another. The memory section has a plurality of priority buffer regions corresponding to a plurality of priority levels, and the message is classified based on a priority level allocated to the message. Each of the plurality of priority buffer regions stores the message having the priority level corresponding to the buffer region.

13 Claims, 8 Drawing Sheets

MULTI-PROCESSOR SYSTEM AND MESSAGE TRANSFERRING METHOD IN THE SAME

CROSS REFERENCE

The present patent application relates to another patent application No. 11/410,140 filed Apr. 25, 2006, titled "MULTI-PROCESSOR SYSTEM AND MESSAGE TRANSFERRING METHOD IN THE SAME" by Shinya KURJBAYASHI, claiming priority based on Japanese Patent Application No. 2005-131378. The disclosure of the other patent application is incorporated herein by reference.

BACKGROUND OF THE INVENTION

1. Field of the Invention

The present invention relates to a multi-processor system and a message transferring method for a multi-processor system, and more particularly, to a multi-processor system, in which a message is transferred between a plurality of processors.

2. Description of the Related Art

There has been known a multi-processor system provided with a plurality of processors such as micro processing units (MPUs). In the multi-processor system, the plurality of processors may transfer messages to each other. As message transferring methods, there are known a method in which a memory independently managed by each of the processors is directly accessed by other processors; a method in which a shared memory is freely accessed by all of the processors; and a method in which a memory region of a shared memory is divided into a region independently managed by each of the processors and a region freely accessed by all of the processors. Here, a "message" is referred to as a unit of data to be transferred.

A buffer managing method is disclosed in Japanese Laid Open Patent Publication (JP-A-Heisei 6-44191: a first conventional example). This first conventional example is relevant to a buffer managing method for a multi-processor system, in which data is temporarily stored in a buffer region when the data is transferred between a plurality of processors. A plurality of buffer regions are provided to be independently managed by the processors, respectively. Each processor controls a reserving process in case of use of the buffer region and a releasing process in case of no necessity of the buffer region to manage the buffer region.

FIG. 1 is a block diagram showing the configuration of the conventional multi-processor system of the first conventional example. The multi-processor system 101 is provided with a plurality of processors (e.g., MPUs) 102-1 to 102-n and a shared memory 103 connected to the processors 102-1 to 102-n via a bus 104. The shared memory 103 has a plurality of message buffers 108-1 to 108-n respectively corresponding to the plurality of processors 102-1 to 102-n. Each of the plurality of processors 102-1 to 102-n manages a corresponding one of the plurality of message buffers 108-1 to 108-n. For example, the message buffer 108-1 is managed by the processor 102-1.

FIG. 2 is a block diagram illustrating the operation of the first conventional example of multi-processor system shown in FIG. 1. Here, it is assumed that there are provided two processors 102-1 and 102-2, in which a message is transmitted from the processor 102-1 to the processor 102-2. At this time, the multi-processor system 101 operates as follows: (1) the processor 102-1 issues a request for reserving a message storage region to the message buffer 108-1 managed by the processor 102-1 per se, thereby reserving the message storage region in the message buffer 108-1; (2) the processor 102-1 transfers a message to the message storage region; (3) the processor 102-2 reads out the message stored in the message buffer 108-1; (4) the processor 102-2 notifies the processor 102-1 of the release of the message storage region in the message buffer 108-1; and (5) the processor 102-1 releases the message storage region in the message buffer 108-1. In this way, the processor 102 manages the reservation and release of the message storage region in the message buffer 108. As the managing method, a method for managing "free or in use" with a bit map and a chain managing method.

In the above example, only one message buffer 108-1 is used, and an FIFO method is adopted for the message buffer 108-1 as a message managing method. As a consequence, a sequence of messages can be kept, but the priorities of messages cannot be reflected. Therefore, a technique is demanded in which the function and performance of the multi-processor system are fulfilled by giving a priority to a message and increasing options of applications.

Furthermore, in order to avoid any confliction of accesses to management data of the message buffer 108 by the plurality of processors 102, the management data of the message buffer 108-1 is managed only by the assigned processor 102-1. In addition, the reserving process and releasing process of the message storage region in the message buffer 108-1 are independently performed by the processor 102-1. Therefore, after the processor 102-2 as a data transmission destination (i.e., on a reception side) receives the message, the processor 102-2 cannot directly perform the releasing process of the message storage region, thereby producing a slight time difference (i.e., a delay) until the processor 102-1 has performed the releasing process. As a result, a technique has been desired such that such a time difference (i.e., a delay) should be eliminated, so as to enhance the throughput of communications between the processors.

SUMMARY OF THE INVENTION

In an aspect of the present invention, a multi-processor system includes a plurality of processors; and a memory section connected with the plurality of processors and configured to store a message transmitted from each of the plurality of processor to another. The memory section has a plurality of priority buffer regions corresponding to a plurality of priority levels, and the message is classified based on a priority level allocated to the message. Each of the plurality of priority buffer regions stores the message having the priority level corresponding to the buffer region.

Here, the memory section may include a plurality of first buffer regions, each of which is provided for a message transmitting processor as each of the plurality of processors, and the plurality of priority buffer regions may be provided for each of the plurality of first buffer regions.

Also, each of the plurality of first buffer regions may include a plurality of second buffer regions corresponding to message receiving processors of the plurality of processors.

Also, the memory section may include a plurality of memory chips for the plurality of first buffer regions.

Also, the plurality of processors may be formed on a single semiconductor chip.

Another aspect of the present invention relates to a message transferring method in a multi-processor system, which includes a plurality of processors; and a memory section connected with the plurality of processors and configured to store a message transmitted from each of the plurality of processor to another, wherein the memory section has a plurality of priority buffer regions corresponding to a plurality of priority levels. The message transferring method is achieved by (a) checking whether or not there is a free region in one of the plurality of priority buffer regions corresponding to a priority level of a transmission message to be transmitted from a transmission processor as one of the plurality of processors; by (b) writing the message in the free region when it is determined that there is the free region; and by (c) repeating the (a) checking and the (b) writing over all of the plurality of priority buffer regions.

Here, the (a) checking may be achieved by (a1) the transmission processor reading out one of a plurality of first management data which corresponds to the priority level of the transmission message, as a transmission side first management data, wherein the plurality of first management data are stored in the memory section and show sizes of free regions of the plurality of priority buffer regions. The (b) writing may be achieved by (b1) the transmission processor updating the transmission side first management data after the writing of the message.

Also, the memory section may include a plurality of first buffer regions corresponding to a plurality of the transmission processors, and the plurality of priority buffer regions may be provided for each of the plurality of first buffer regions. The (a1) reading out may be achieved by (a11) the transmission processor reading out the transmission side first management data stored in a transmission side first buffer region as one of the plurality of first buffer regions which corresponds to the transmission processor.

Also, each of the plurality of first buffer regions may include a plurality of second buffer regions corresponding to reception processors. The (a11) reading out may be achieved by (a111) the transmission processor reading out the transmission side first management data stored in a reception side second buffer region as one of the plurality of second buffer regions which corresponds to one of the reception processors.

Also, the message transferring method may be achieved by further (d) a reception processor of receiving the message checking whether or not there is the transmission message in one of the plurality of priority buffer regions which corresponds to a predetermined priority level; (e) the reception processor reading out the transmission message when there is the transmission message; and (f) repeating the (d) checking and the (e) reading out over all of the plurality of priority buffer regions.

Also, the (d) checking may be achieved by (d1) the reception processor reading out a transmission side second management data as one of a plurality of second management data which corresponds to the predetermined priority level, wherein the plurality of second management data are stored in the memory section and show that the transmission message is stored in the plurality of priority buffer regions. The (e) reading out may be achieved by (e1) the reception processor rewriting the transmission side second management data after the reading out of the transmission message.

Also, the memory section may include a plurality of first buffer regions corresponding to a plurality of the transmission processors, and the plurality of priority buffer regions are provided for each of the plurality of first buffer regions. The (d1) reading out may be achieved by (d11) the reception processor reading out the transmission side second management data stored in a transmission side first buffer region as one of the plurality of first buffer regions which corresponds to the transmission processor.

Also, each of the plurality of first buffer regions may include a plurality of second buffer regions corresponding to reception processors. The (d11) reading out may be achieved by (d111) the reception processor reading out the transmission side second management data stored in a reception side second buffer region as one of the plurality of second buffer regions which corresponds to the reception processor.

Another aspect of the present invention relates to a computer-readable medium storing software for realizing a message transferring method in a multi-processor system, which comprises a plurality of processors; and a memory section connected with the plurality of processors and configured to store a message transmitted from each of the plurality of processor to another.

DESCRIPTION OF THE PREFERRED EMBODIMENTS

Hereinafter, a multi-processor system and a message transferring method for the multi-processor system according to the present invention will be described in detail with reference to the attached drawings.

Figure 1:
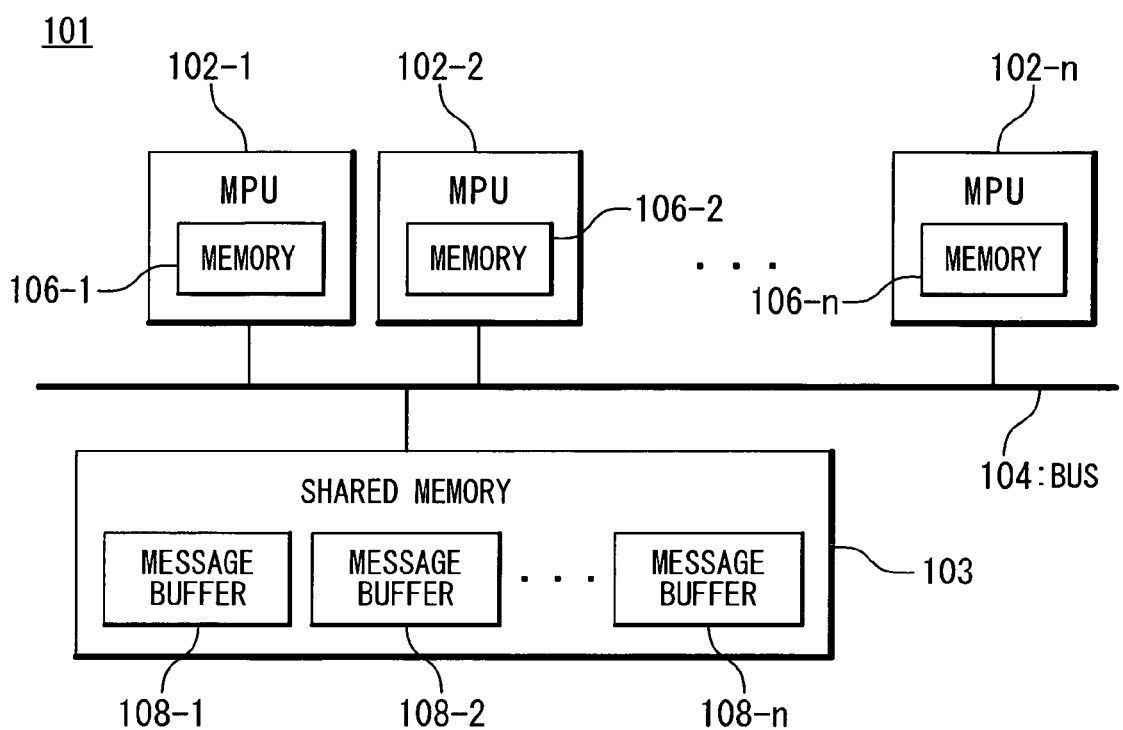
FIG. 1 is a block diagram illustrating the configuration of a first conventional example of a multi-processor system.
Figure 2:
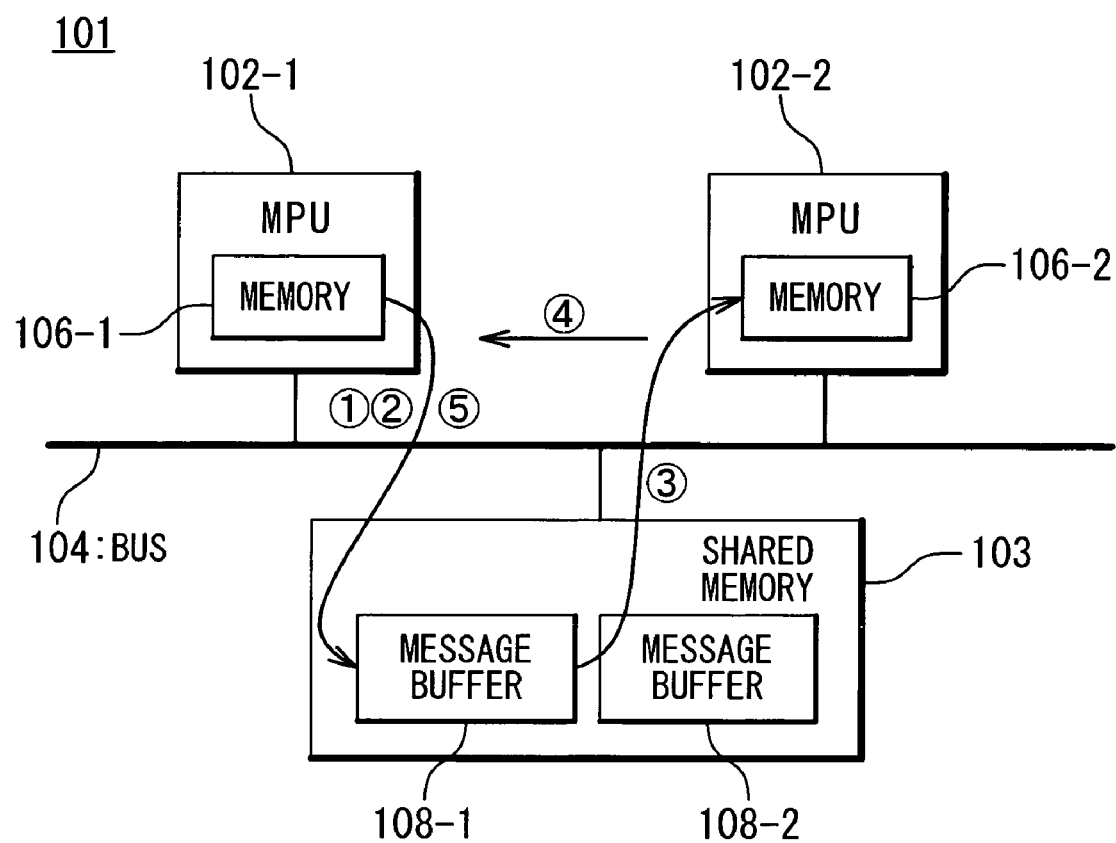
FIG. 2 is a diagram illustrating the operation of the first conventional example of the multi-processor system.
Figure 3:
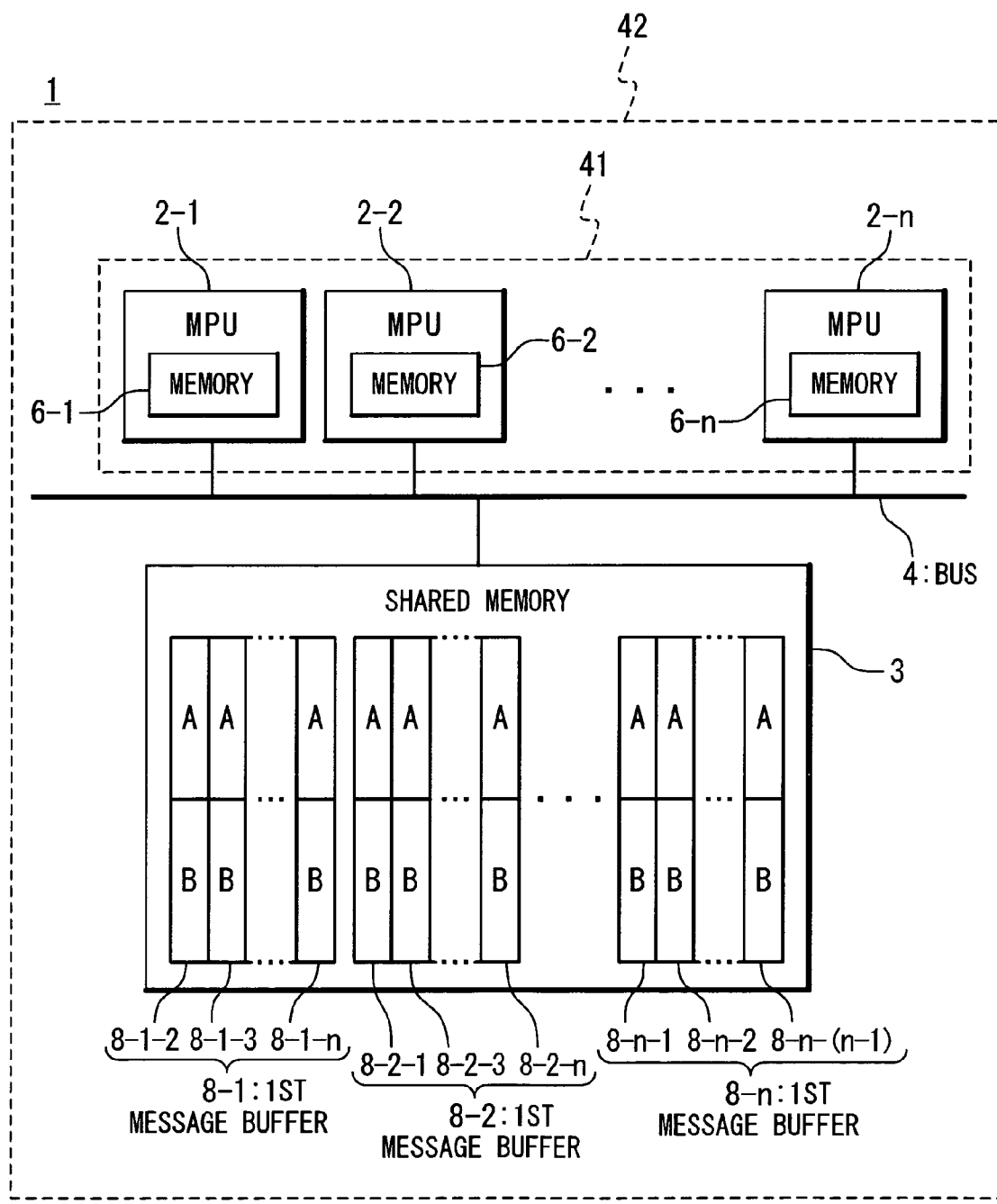
FIG. 3 is a block diagram illustrating the configuration of a multi-processor system according to a first embodiment of the present invention.

FIG. 3 is a block diagram illustrating the configuration of the multi-processor system according to the first embodiment of the present invention. Referring to FIG. 3, the multi-processor system 1 includes a plurality of processors 2-1 to 2-n and a shared memory 3.

Each of the plurality of processors 2-1 to 2-n is an operation process unit such as an MPU (micro process unit), a CPU (central process unit) or one core in a multiple core processor. The processor 2-i (i=1 to n) has a memory 6-i for storing a message therein.

The shared memory 3 is shared by the plurality of processors 2-1 to 2-n, and stores a message to be transmitted from one of the plurality of processors 2-1 to 2-n to another processor. The shared memory 3 is connected to the plurality of processors 2-1 to 2-n via a bus 4. Here, a "message" is referred to as a unit of data to be transmitted or received in communication between the processors. The shared memory 3 has a plurality of first message buffers 8-1 to 8-n. The plurality of first message buffers 8-1 to 8-n are provided for the plurality of processors 2-1 to 2-n, respectively. Specifically, the first message buffer 8-i corresponds to the processor 2-i. For example, the first message buffer 8-1 corresponds to the processor 2-1. When the processor 2-i transfers a message to another processor 2-j (j≈i, and j=1 to n), the processor 2-i stores the message in the corresponding one 8-i of the first message buffers. Consequently, if the processor 2-i on the transmission side is found, the processor 2-j on a reception side can readily access to the first message buffer 8-i, in which the message is stored. Each of the first message buffers 8-1 to 8-n includes a plurality of second message buffers 8-i-j (j≈i, and i, j=1 to n).

The plurality of second message buffers 8-i-j are provided for the plurality of processors 2-1 to 2-n on the reception side (i.e., transmission destination side). Specifically, the first message buffer 8-i includes the plurality of second message buffers 8-i-1 to 8-i-n (1 to n do not contain i). The second message buffer 8-i-j stores therein a message to be transmitted from the processor 2-i on the transmission side to the processor 2-j on the reception side. For example, the first message buffer 8-1 includes the plurality of second message buffers 8-1-2 to 8-1-n. In addition, the second message buffer 8-1-2 stores therein a message to be transmitted from the processor 2-1 on the transmission side to the processor 2-2 on the reception side. As a result, the processor 2-i on the transmission side only inputs a message to the second message buffer 8-i-j corresponding to the processor 2-j on the reception side. Consequently, if the processor 2-i on the transmission side is found, the processor 2-j on the reception side can more readily access to a buffer, in which the message is stored. Here, each of the plurality of second message buffers 8-(1~n)-(1~n) includes a high priority region A and a low priority region B corresponding to a plurality of priorities, by which the messages are classified.

The high priority region A stores therein one, having a higher priority, of the messages to be transmitted. In contrast, the lower priority region B stores therein one, having a lower priority, of the messages to be transmitted. Here, although a case of two types of priorities is described, more types of priorities may be provided. In such a case, each of the plurality of second message buffers 8-(1~n)-(1~n) is further divided into regions corresponding to the number of types of priorities. As a consequence, the processor 2-i on the transmission side stores the message having the priority in the high priority region A or the low priority region B in accordance with the priority, so that the processor 2-j on the reception side can access to the message in the order of priority. Thus, the messages can be sequentially read in the order from the high priority to the low priority.

The plurality of processors 2-1 to 2-n may be formed in semiconductor chips independent of each other, respectively. Otherwise, the plurality of processors 2-1 to 2-n may be formed on a single semiconductor chip 41. Alternatively, the plurality of processors 2-1 to 2-n and the shared memory 3 may be formed on a single semiconductor chip 42.

Figure 8:
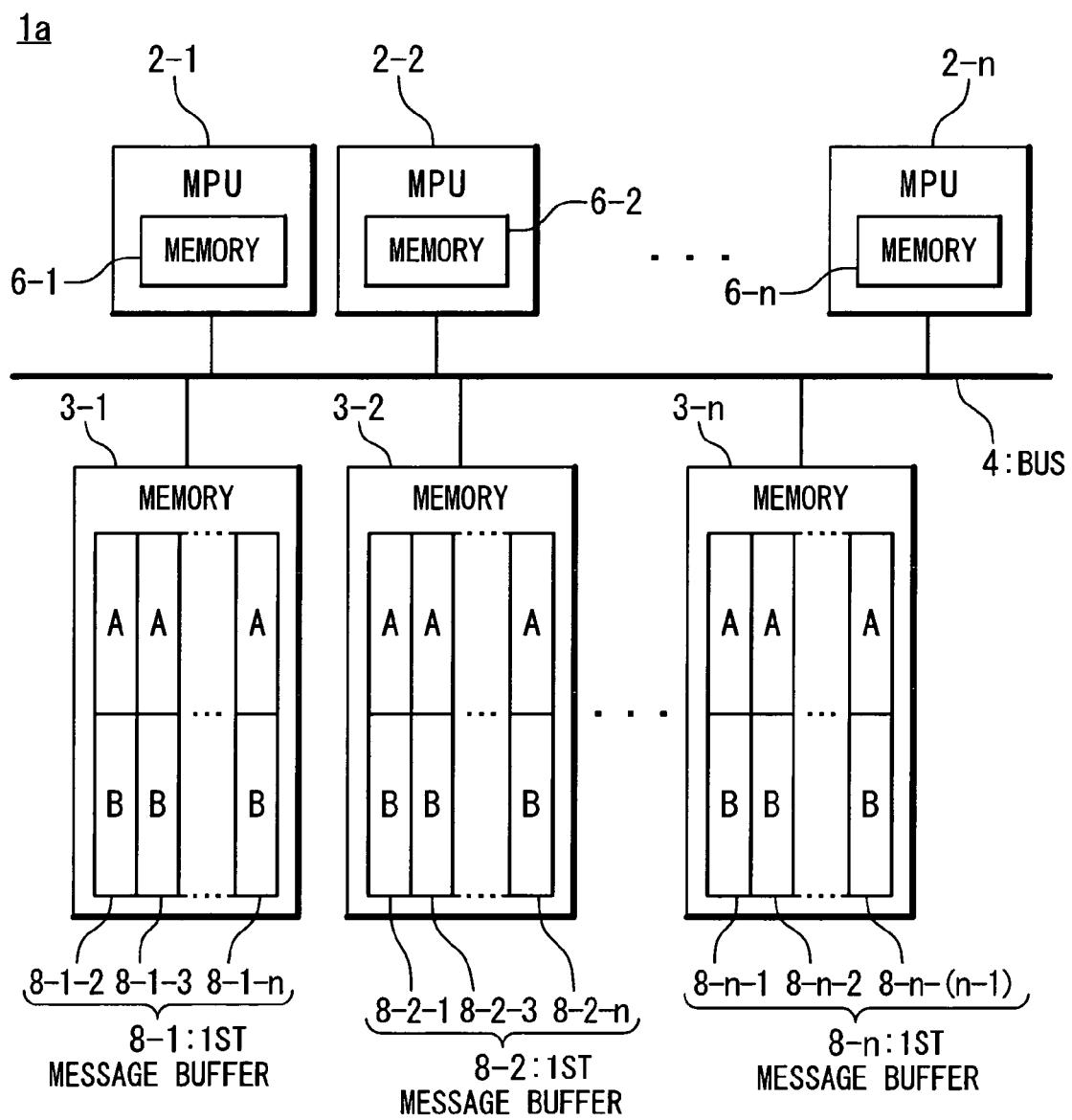
FIG. 8 is a block diagram illustrating the configuration of the multi-processor system according to a second embodiment of the present invention.

FIG. 8 is a block diagram illustrating the configuration of the multi-processor system according to the second embodiment of the present invention. As shown in FIG. 8, in the multi-processor system 1a, a plurality of first message buffers 8-1 to 8-n may be included not in a shared memory 3 but in a plurality of memories 3-1 to 3-n independent of each other, respectively.

Figure 4:
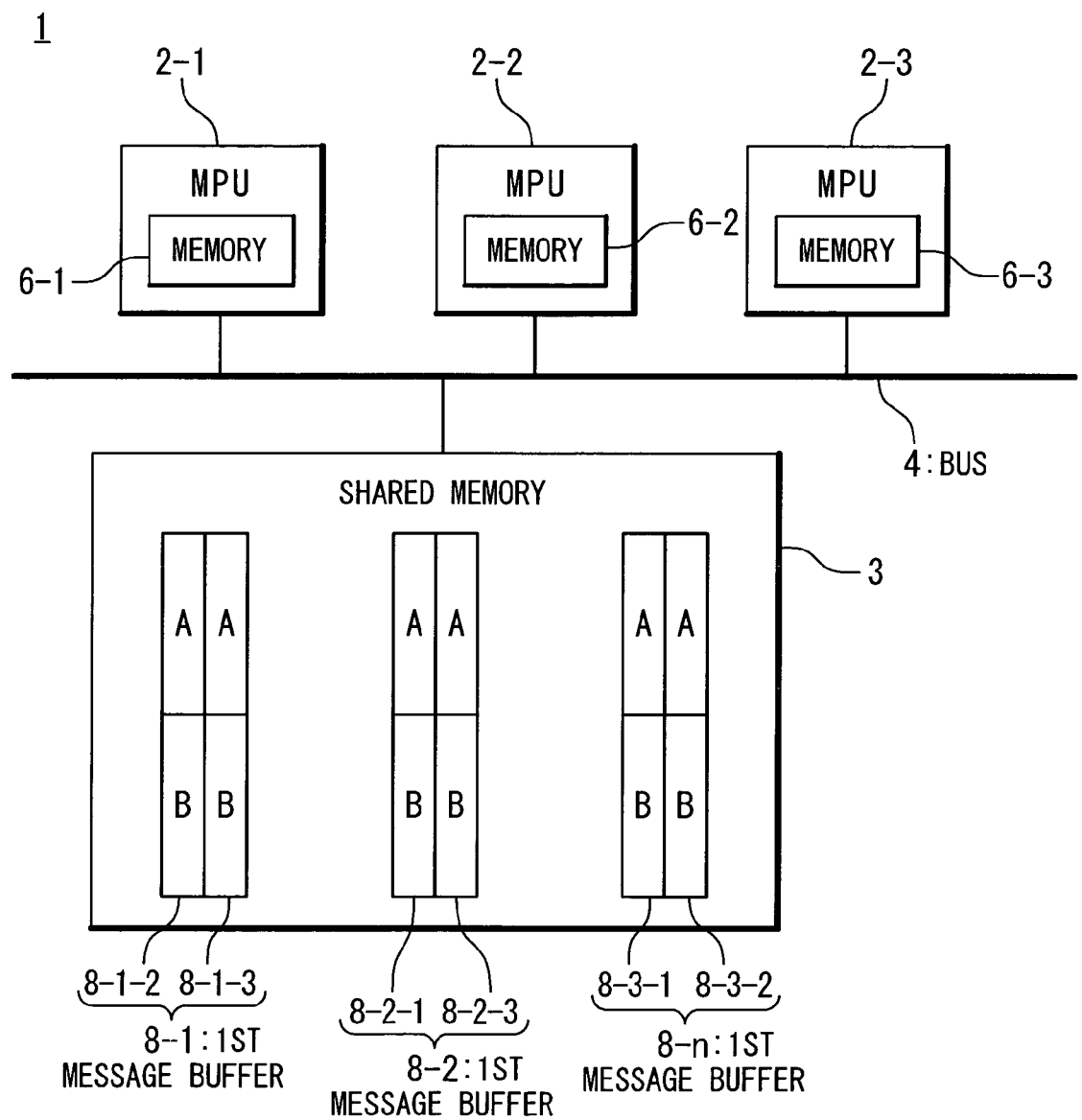
FIG. 4 is a block diagram illustrating the configuration of one example of the multi-processor system in the first embodiment according to the present invention.

FIG. 4 is a block diagram illustrating the configuration of the multi-processor system according to the first embodiment of the present invention, in which n is set to be 3. The multi-processor system 1 includes the processors 2-1 to 2-3 and the shared memory 3, which are connected to each other via the bus 4. The processors 2-1 to 2-3 include the memories 6-1 to 6-3, respectively. The shared memory 3 includes the first message buffers 8-1 to 8-3. The first message buffers 8-1 to 8-3 are provide for the plurality of processors 2-1 to 2-3 on the message transmission side, respectively. The first message buffer 8-1 includes the second message buffers 8-1-2 and 8-1-3; the first message buffer 8-2 includes the second message buffers 8-2-1 and 8-2-3; and the first message buffer 8-3 includes the second message buffers 8-3-1 and 8-3-2.

The first message buffer 8-1 is provided for the processor 2-1 on the message transmission side (i.e., a transmission source). The second message buffer 8-1-2 stores therein a message to be transmitted from the processor 2-1 on the transmission side to the processor 2-2 on the reception side. The other second message buffer 8-1-3 stores therein a message to be transmitted from the processor 2-1 on the transmission side to the processor 2-3 on the reception side. In the same manner, the first message buffer 8-2 is provided for the processor 2-2 on the message transmission side (i.e., the transmission source). The second message buffer 8-2-1 stores therein a message to be transmitted from the processor 2-2 on the transmission side to the processor 2-1 on the reception side. The other second message buffer 8-2-3 stores therein a message to be transmitted from the processor 2-2 on the transmission side to the processor 2-3 on the reception side. Similarly, the first message buffer 8-3 is provided for the processor 2-3 on the message transmission side (i.e., the transmission source). The second message buffer 8-3-1 stores therein a message to be transmitted from the processor 2-3 on the transmission side to the processor 2-1 on the reception side. The other second message buffer 8-3-2 stores therein a message to be transmitted from the processor 2-3 on the transmission side to the processor 2-2 on the reception side.

Here, each of the second message buffers 8-1-2, 8-1-3, 8-2-1, 8-2-3, 8-3-1 and 8-3-2 includes the higher priority region A and the lower priority region B in accordance with a plurality of priorities, by which the messages are classified.

Figure 5:
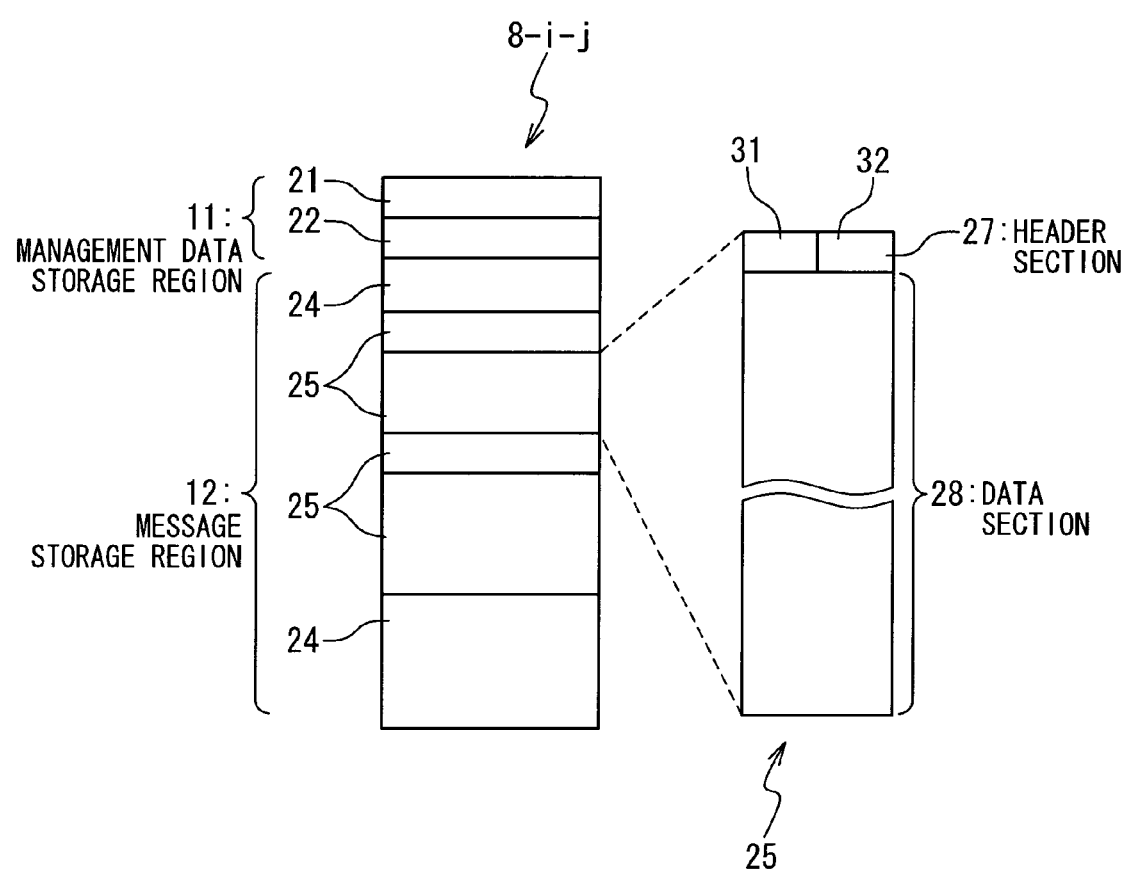
FIG. 5 is a diagram illustrating the configuration of a message buffer region and a message in the multi-processor system in the first embodiment.

FIG. 5 is a diagram illustrating the configuration of the second message buffer and the message in the multi-processor system in the first embodiment of the present invention. The configuration of the second message buffer 8-i-j is common in both of the higher priority region A and the lower priority region B, and therefore FIG. 5 illustrates either one of the regions. The second message buffer 8-i-j includes a management data storage region 11 and a message storage region 12.

The management data storage region 11 stores therein management data for use in managing the message storage region 12. The management data storage region 11 includes a head storage region 21, in which head data is stored, and a tail storage region 22, in which tail data is stored. The head data contains therein a head address of a region, in which a message waiting for reception (i.e., a not-received message: namely, a message transmitted from the processor 2-i on the transmission side has not been received yet by the processor 2-j on the reception side) is stored. The head data is designed to be rewritten only by the processor 2-j on the message reception side. In the meantime, the tail data contains therein a head address of a region, which has not been used yet, in the message storage region 12. The tail data is designed to be rewritten only by the processor 2-i on the message transmission side. The management data storage region 11 may store therein other management data such as a message buffer remaining size indicating the largest size of a writable message. The message buffer remaining size may be appropriately used in accordance with a shake hand system between the processors 2. The above-described address data for managing the second message buffer 8-i-j is designed to be ring-managed.

Since the head data can be rewritten only by the processor 2-j on the reception side, while the tail data can be rewritten only by the processor 2-i on the transmission side, the management data in the single second message buffer 8-i-j can be written by the processors 2 different from each other. Consequently, the throughput of communications between the processors can be more improved, compared with a case where the data can be written only by the processor 2-i.

The message storage region 12 includes regions, in each of which a message 25 is stored, and non-use regions 24, in each of which no message is stored. FIG. 5 illustrates an example, in which four messages 25 are stored between the upper and lower non-use regions 24. Here, it is assumed that data indicating a head address of the message storage region 12 is referred to as a buf_base data and data indicating a region size of the message storage region 12 is referred to as a buf_size data. The buf_base data and the buf_size data are values inherent to each of the second message buffers 8-i-j. The relationships between each of the second message buffers 8-i-j and both of the buf_base data and the buf_size data are stored in the form of a table in the memory in each of the processors 2-1 to 2-n. It should be noted that each of the second message buffers 8-i-j may store its own buf_base data and buf_size data at predetermined address positions in the management data storage region 11. In such a case, the processors 2-i and 2-j accessing to each of the second message buffers 8-i-j refer to the above-described data.

The message 25 of a header section 27 of one word and a data section 28 of an arbitrary word length. The header section 27 includes therein a status field 31 storing therein status data (of a half word) and a size field 32 storing therein size data (of a half word). The size data indicates a length of the data section 28 (i.e., a message data length). The status data contains message attributes, and further contains at least reception confirmation data indicating whether or not the message 25 has been already received by the processor 2-j on the reception side. The processor 2-j on the reception side rewrites the reception confirmation data in the status field upon receipt of the message.

A word in the message 25 (of the header section 27 and the data section 28) should be preferably aligned. Since installation becomes complicated if a variable length on a bite level is to be achieved in installing the multi-processor system according to the present invention, it is conceivable that an overhead for that process may be increased. Therefore, the overhead can be suppressed at a low value by aligning the word. It should be noted that the data length of the message can cope with both of a fixed length and a variable length if the word is aligned.

Figure 6:
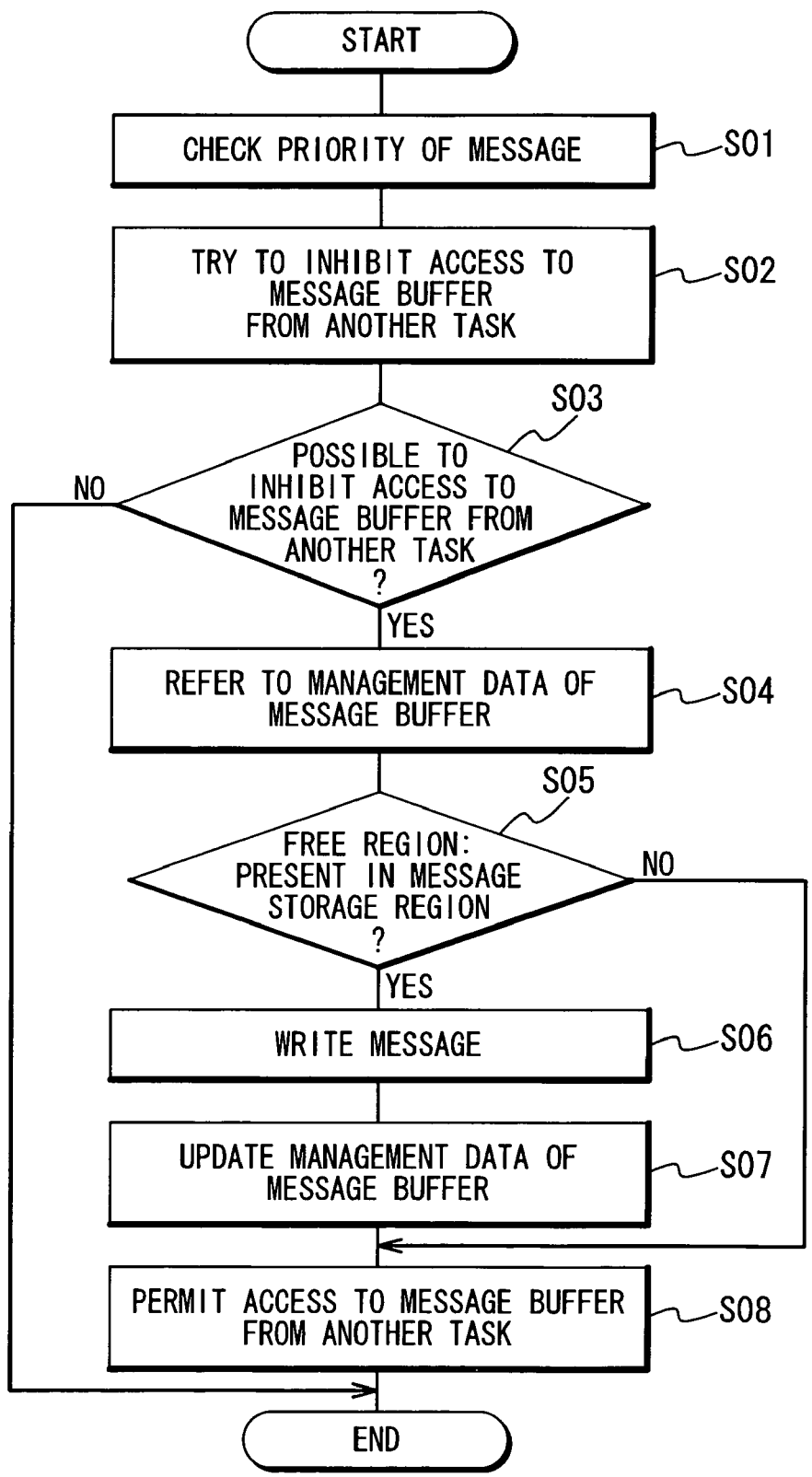
FIG. 6 is a flowchart illustrating a message transferring method in the multi-processor system in the first embodiment.
Figure 7:
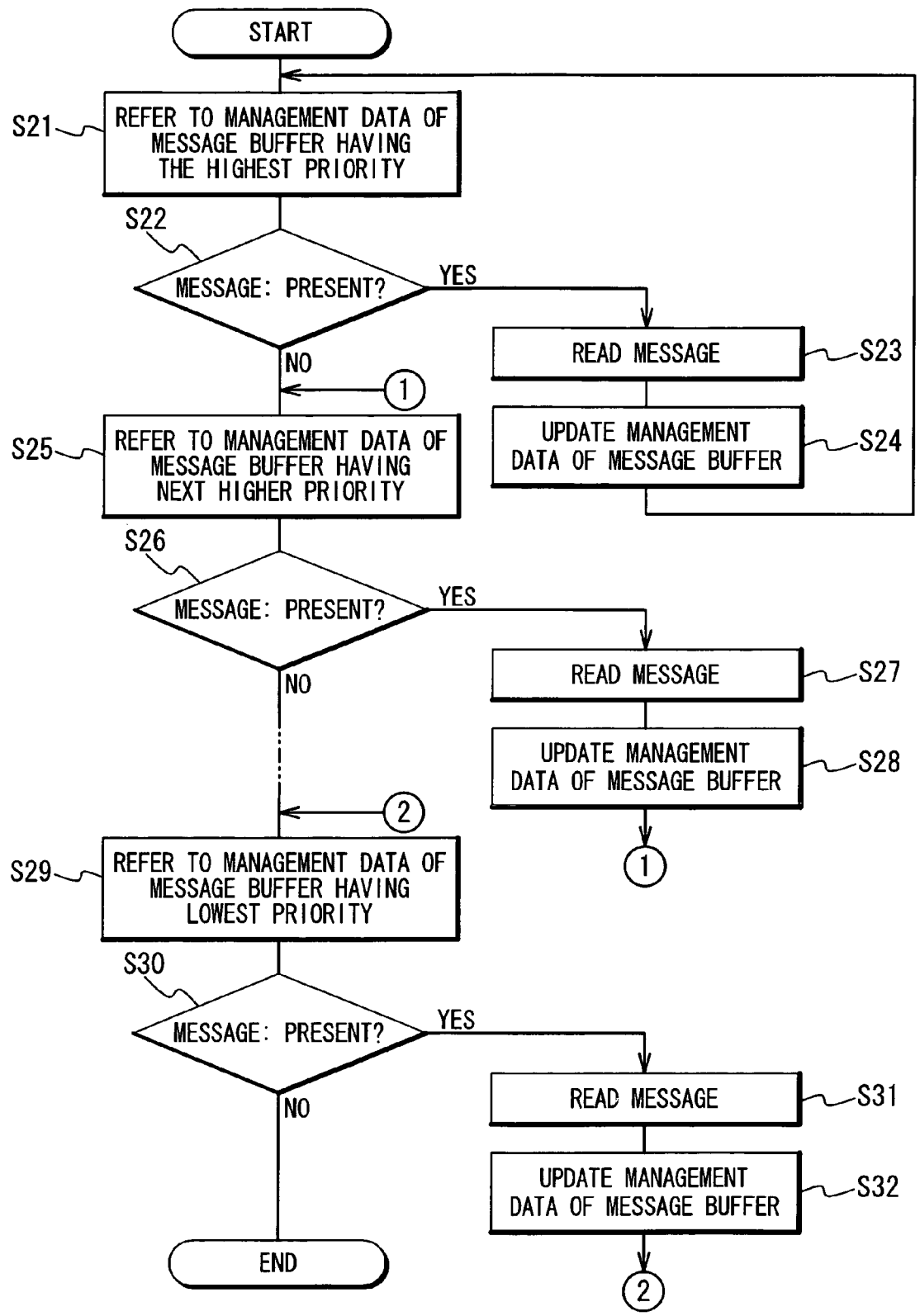
FIG. 7 is another flowchart illustrating the message transferring method in the multi-processor system in the first embodiment.

Next, the message transferring method for the multi-processor system in the first embodiment according to the present invention will be described. FIGS. 6 and 7 are flowcharts illustrating a message transferring method for the multi-processor system according to the present invention. Here, FIG. 6 illustrates a transmitting operation: in contrast, FIG. 7 illustrates a receiving operation.

In the message transferring method, the data write (i.e., a message transmitting operation) or data read (i.e., a message receiving operation) to or from the second message buffer 8-i-j may be asynchronously carried out at an arbitrary timing by the processor 2-i on the transmission side or the processor 2-j on the reception side. At this time, as to the management data on the second message buffer 8-i-j, a required portion can be updated by each of the processor 2-i on the transmission side and the processor 2-j on the reception side. In other words, there is no limitation that the management data can be updated by only either one of the processors 2. Here, the transfer of the data from the processor 2-1 on the transmission side to the processor 2-2 on the reception side in the multi-processor system illustrated in FIG. 4 will be described below. In this case, the second message buffer 8-1-2 is used as the second message buffer 8-i-j.

First, the transmitting operation by the processor 2-1 will be described referring to FIG. 6.

(1) Step S01

The processor 2-1 on the transmission side acquires a message to be transmitted to the processor 2-2 on the reception side. The processor 2-1 on the transmission side confirms the priority of the message. Thereafter, the processor 2-1 on the transmission side determines whether the message is to be transmitted to the high priority region A or the low priority region B in the second message buffer 8-1-2. If the priority of the message is "high", the message is stored in the high priority region A in the second message buffer 8-1-2 (hereinafter designated by "8-1-2-A").

(2) Step S02

The processor 2-1 tries to prohibit any access to the second message buffer 8-1-2-A, in which the message is to be stored, from another task. Here, another task means another task in the same processor 2-1. In one example of an access prohibiting method, a shared memory access semaphore is provided in accordance with the number of message buffers (i.e., four message buffers 8-1-2-A, 8-1-2-B, 8-1-3-A and 8-1-3-B) in the second message buffer 8-1, and then the processor 2-1 acquires or loses an access right. When the processor 2-1 can directly control a scheduler, the processor 2-1 may stop scheduling.

(3) Step S03

The processor 2-1 determines whether or not the second message buffer 8-1-2-A, in which the message is to be stored, can be prohibited from being accessed from another task. If the access cannot be prohibited (No in the step S03), for example, if the shared memory access semaphore is used, the other task acquires the access right to the second message buffer 8-1-2-A. As a consequence, when the processor 2-1 cannot acquire the access right to the second message buffer 8-1-2-A, the processor 2-1 needs to retry acquisition of the access right. For example, the processor 2-1 retries after a lapse of a predetermined period of time.

(4) Step S04

If the access can be prohibited (Yes at the step S03), the processor 2-1 starts the message transmitting operation (i.e., the writing operation). The processor 2-1 first refers to the management data stored in the management data storage region 11 in the second message buffer 8-1-2-A. Specifically, the processor 2-1 acquires the head data stored in the head storage region 21 and the tail data stored in the tail storage region 22. In an initial state, the message storage region 12 is not used at all. At this time, the buf_base data, the head data and the tail data all are the same as each other.

(5) Step S05

The processor 2-1 compares the head data with the tail data.

(a) When the head data is the same as the tail data, either only the reception waiting messages exist in the message storage region 12 or only the non-use regions exist in the message storage region 12. The processor 2-1 reads one word from the head address indicated by the tail data, and refers to the status data in the status field 31 in the header portion 27.

(a-1) Referring to the status data in the status field 31, when the reception waiting messages exist in all the message storage regions 12, the processor 2-1 determines that there is no free region in the message storage region 12 (No in step S05).

(a-2) In contrast, referring to the status data in the status field 31, when only the non-use regions exist in all the message storage regions 12, the processor 2-1 determines that there a free region in the message storage region 12 (Yes in step S05).

(b) When the head data is different from the tail data, the processor 2-1 immediately calculates the size of the non-use region. If the head data is greater than the tail data, the non-use region has a size obtained by subtracting the tail data from the head data. In contrast, if the head data is smaller than the tail data, the non-use region has a size expressed by the following calculation: ((buf_base data+buf_size data−tail data)+(head data−buf_base data)). Thereafter, the processor 2-1 compares the length of the message indicated by the size data on the message 25 with the size of the computed non-use region.

(b-1) When the length of the message 25 exceeds the size of the non-use region, the processor 2-1 determines that there is no free region in the message storage region 12 (No in step S05).

(b-2) In contrast, when the length of the message 25 is equal to or less than the size of the non-use region, the processor 2-1 determines that there is a free region in the message storage region 12 (Yes in step S05).

In the above-described items (a) and (b), when the processor 2-1 determines that there is no free region in the message storage region 12 (No in step S05 in the items (a-1) and (b-1)), the processor 2-1 holds the transmission of the message, and then retries the transmission when the non-use region is reserved upon receipt of the message. For example, the processor 2-1 retries the transmission after a lapse of a predetermined time. At this time, the processor 2-1 may or may not lose the access right to the second message buffer 8-1-2-A.

(6) Step S06

In the above-described items (a) and (b), when the processor 2-1 determines that there is a free region in the message storage region 12 (Yes in the step S05 in the items (a-2) and (b-2)), the processor 2-1 sequentially writes the header section 27 and the data section 28 in the message storage region 12 in the second message buffer 8-1-2-A based on the tail data. It should be noted that in the writing the message 25, the data section 28 may possibly stride across (i.e., wrap around) a boundary of the message storage region 12 (i.e., buf_base data+buf_size data). In such a case, the wrap-around of the data section 28 can be overcome by a conventionally known method. Thereafter, the processor 2-1 clears the reception confirmation data out of the status data stored in the status data field 31 of the written message 25 in the message storage region 12.

(7) Step S07

The processor 2-1 rewrites the tail data in the tail storage region 22 (i.e., a tail pointer) to an address at a position next to a position, at which the message 25 is stored.

(8) Step S08

The processor 2-1 notifies the processor 2-2 of an interruption indicating the storage of the message 25 in the second message buffer 8-1-2. At the same time, the processor 2-1 permits an access to the second message buffer 8-1-2-A from the other task, which has been prohibited in step S02. For example, in case of the shared memory access semaphore, the processor 2-1 releases the semaphore. Otherwise, in case of the stop of the scheduling, the processor 2-1 permits the scheduling.

After that, the processor 2-1 returns to the step S01 if there are more messages 25 to be written in the second message buffer 8-1-2, and repeats the above-described operation (in the steps S01 to S08). It should be noted that when there are more messages 25 to be written in the second message buffer 8-1-2, the processor 2-1 may return to the step S04 after the step S07, and then may repeat the above-described operation (in the steps S04 to S07).

With the above-described operation, the processor 2-1 on the transmission side can write the message 25 to be transferred to the processor 2-2 on the reception side in the second message buffer 8-1-2 (-A or -B) specially provided in the processor 2-2. It should be noted that if there cannot be used any exclusive control method on a high level (such as semaphore management or schedule management) without any OS, it is unnecessary to consider access confliction to the shared memory 3 by a plurality of tasks (that is, no access contention occurs) since no concept of a task exists.

Subsequently, the receiving operation by the processor 2-2 will be described referring to FIG. 7.

(1) Step S21

The processor 2-2 on the reception side starts the data receiving operation (i.e., the reading operation) based on the interruption notification transmitted by the processor 2-1 on the transmission side. The processor 2-2 on the reception side accesses to the second message buffer 8-1-2-A having a first priority out of the second message buffers 8-1-2, and then refers to the management data stored in the management data storage region 11. That is to say, the processor 2-2 acquires the head data stored in the head storage region 21 and the tail data stored in the tail storage region 22.

(2) Step S22

Referring to the head data stored in the head storage region 21 and the tail data stored in the tail storage region 22, the processor 2-2 determines whether or not the message 25 to be received exists in the second message buffer 8-1-2-A.

(a) When the tail data is the same as the head data, either only the reception waiting messages exist in the message storage region 12 or only non-use regions exist in the message storage region 12. The processor 2-2 reads one word from the head address indicated by the head data, and refers to the status data in the status field 31 in the header portion 27.

(a-1) When the status data contains no reception confirmation data indicating whether or not the data has been already received, the processor 2-2 determines that all of the messages 25 are not-received messages (Yes in step S22).

(a-2) In contrast, when the status data contains the reception confirmation data, the processor 2-2 determines that only the non-use regions exist in the message storage region 12 (No in step S22).

(b) When the head data is different from the tail data, the processor 2-2 determines that a not-received message exists in a part of the message storage region 12 (Yes in step S22).

(3) Step S23

(c) When all of the messages 25 are the not-received messages (Yes in step S22 in the item (a-1)), the processor 2-2 acquires the data size (i.e., the message data length) of the data section 28 from the size field 32 based on the head data, to thus receive (i.e., read) one message 25.

(d) When the not-received message exists in a part of the message storage region 12 (Yes in step S22 in the item (b)), the processor 2-2 compares the head data with the tail data.

(d-1) If the head data is greater than the tail data, the processor 2-2 calculates a size of a region, in which the not-received messages are sequentially stored, (i.e., a sequential storage region size). In other words, the processor 2-2 obtains the sequential storage region size expressed by (the buf_base data+the buf_size data−the head data). Thereafter, the processor 2-2 reads one word from the head address indicated by the head data, and then, acquires the data size of the data portion 28 from the size field 32. Then, the processor 2-2 calculates the sequential storage region size with the data size of the data portion 28, thereby determining whether or not the not-received message is landed up.

(d-1-1) If the sequential storage region size is greater than the data size, it can be determined that the data portion 28 is not wrapped around. As a consequence, the processor 2-2 receives (i.e., reads) one message 25 of the data size of the data section 28 based on the head data.

(d-1-2) In contrast, if the sequential storage region size is smaller than the data size, it can be determined that the data section 28 is wrapped around. As a consequence, the processor 2-2 combines the data of the sequential storage region size starting from the head data with the data of (the data size—the sequential storage region size) starting from the buf_base data, to thus receive (i.e., read) the combined data as one message 25.

(d-2) If the head data is smaller than the tail data, it can be determined that the data section 28 is not wrapped around. As a consequence, the processor 2-2 acquires the data size (i.e., the message data length) of the data section 28 from the size field 32 based on the head data, to thus receive (i.e., read) one message 25.

(4) Step S24

Thereafter, the processor 2-2 converts the reception confirmation data on the status data stored in the status field 31 in the read message 25 in the message storage region 12 into received data. Then, the processor 2-2 rewrites the head data in the head storage region 21 to an address of a position, at which the message 25 next to the read message 25 is stored. The process returns to the step S21, and then the reading operation is repeated until there is no message 25 in the second message buffer 8-1-2-A.

When there is no message 25 in the second message buffer 8-1-2-A (No in step S22), the processor 2-2 carries out the process at the steps S25 to S28 to a second message buffer 8-1-2-B having a second priority out of the second message buffers 8-1-2 in the same manner as in the steps S21 to S24. Similarly, the reading operation of the message 25 is repeated until there is no message 25 in a second message buffer having a last priority (steps S29 to S32). In the above-described manner, the processor 2-2 on the reception side can read, from the second message buffer 8-1-2(-A or -B) provided specially for the processor 2-2, the message 25 transferred from the processor 2-1 on the transmission side. The process can be performed in the same manner even in case of the other processors 2-i on the transmission side or the other processors 2-j on the reception side.

It should be noted that when the processor 2-2 on the reception side accesses to the second message buffer 8-1-2 in the step S21, a message receiving task is designed to be provide in the processor 2-j on the reception side such that only the task accesses to the second message buffer 8-1-2 in the shared memory 3. In order to allow each of a plurality of tasks to access to the shared memory 3 inside of the processor 2-2 on the reception side, an exclusive operation is designed, as performed in the step S02 in the transmitting operation.

Although the above-described operation has been described on the example illustrated in FIG. 4, the operation can be similarly performed in the example illustrated in FIG. 3.

According to the present invention, the processor 2-i on the message transmission side updates only the tail data in the tail storage region 22 and the status data in the message 25, while the processor 2-j on the message reception side updates only the head data in the head storage region 21 and the status data in the message 25, thereby preventing any occurrence of the access contention to the message buffer management data between the processor 2-i on the transmission side and the processor 2-j on the reception side. Thus, no release notification need be sent, unlike in the conventional example.

Additionally, the operation can be performed in the same manner by properly utilizing the tail data, the head data, the buf_base data and the buf_size data even in the case of a message 25 of a variable length.

According to the present invention, since the processor 2-i on the transmission side can store the messages 25 according to the priorities, the processor 2-j on the reception side can receive the messages 25 in the descending priority order. In addition, the management data stored in one second message buffer 8-i-j is classified into a part to be rewritten by the processor 2-j on the reception side and a part to be rewritten by the processor 2-i on the transmission side, so that the writing operation can be performed by the processors 2 different from each other, thus enhancing the throughput of the communications between the processors.

According to the present invention, the communications between the processors can be implemented in accordance with the priority of the message to be transmitted or received. Additionally, the throughput of the communications between the processors can be enhanced.

What is claimed is:

1. A message transferring method in a multi-processor system, which comprises a plurality of processors; and a memory section connected with said plurality of processors and configured to store a message transmitted from each of said plurality of processors to another, wherein said memory section has a plurality of priority buffer regions corresponding to a plurality of priority levels, said message transferring method comprising:

(a) checking whether or not there is a free region in one of said plurality of priority buffer regions corresponding to a priority level of a transmission message to be transmitted from a transmission processor as one of said plurality of processors;

(b) writing said message in said free region when it is determined that there is said free region; and (c) repeating said (a) checking and said (b) writing over all of said plurality of priority buffer regions, wherein said (a) checking comprises:

(a1) said transmission processor reading out one of a plurality of first management data which corresponds to said priority level of said transmission message, as a transmission side first management data, wherein said plurality of first management data are stored in said memory section and show sizes of free regions of said plurality of priority buffer regions, and said (b) writing comprises:

(b1) said transmission processor updating said transmission side first management data after said writing of said message.

2. The message transferring method according to claim 1, wherein said memory section comprises a plurality of first buffer regions corresponding to a plurality of said transmission processors, said plurality of priority buffer regions are provided for each of said plurality of first buffer regions, and said (a1) reading out comprises:

(a11) said transmission processor reading out said transmission side first management data stored in a transmission side first buffer region as one of said plurality of first buffer regions which corresponds to said transmission processor.

3. The message transferring method according to claim 2, wherein each of said plurality of first buffer regions comprises a plurality of second buffer regions corresponding to reception processors, and
said (a11) reading out comprises:
(a111) said transmission processor reading out said transmission side first management data stored in a reception side second buffer region as one of said plurality of second buffer regions which corresponds to one of said reception processors.

4. The message transferring method according to claim 1, further comprising:
(d) a reception processor of receiving said message checking whether or not there is said transmission message in one of said plurality of priority buffer regions which corresponds to a predetermined priority level;
(e) said reception processor reading out said transmission message when there is said transmission message; and
(f) repeating said (d) checking and said (e) reading out over all of said plurality of priority buffer regions.

5. The message transferring method according to claim 4, wherein said (d) checking comprises:
(d1) said reception processor reading out a transmission side second management data as one of a plurality of second management data which corresponds to said predetermined priority level, wherein said plurality of second management data are stored in said memory section and show that said transmission message is stored in said plurality of priority buffer regions, and
said (e) reading out comprises:
(e1) said reception processor rewriting said transmission side second management data after said reading out of said transmission message.

6. The message transferring method according to claim 5, wherein said memory section comprises a plurality of first buffer regions corresponding to a plurality of said transmission processors,
said plurality of priority buffer regions are provided for each of said plurality of first buffer regions, and
said (d1) reading out comprises:
(d11) said reception processor reading out said transmission side second management data stored in a transmission side first buffer region as one of said plurality of first buffer regions which corresponds to said transmission processor.

7. The message transferring method according to claim 6, wherein each of said plurality of first buffer regions comprises a plurality of second buffer regions corresponding to reception processors, and
said (d11) reading out comprises:
(d111) said reception processor reading out said transmission side second management data stored in a reception side second buffer region as one of said plurality of second buffer regions which corresponds to said reception processor.

8. A computer-readable medium having computer-executable instructions for performing a message transferring method in a multi-processor system,
which comprises a plurality of processors; and
a memory section connected with said plurality of processors and configured to store a message transmitted from each of said plurality of processors to another, wherein said memory section has a plurality of priority buffer regions corresponding to a plurality of priority levels,
wherein said message transferring method comprises:
(a) checking whether or not there is a free region in one of said plurality of priority buffer regions corresponding to a priority level of a transmission message to be transmitted from a transmission processor as one of said plurality of processors;
(b) writing said message in said free region when it is determined that there is said free region; and
(c) repeating said (a) checking and said (b) writing over all of said plurality of priority buffer regions, wherein said (a) checking comprises:
(a1) said transmission processor reading out one of a plurality of first management data which corresponds to said priority level of said transmission message, as a transmission side first management data, wherein said plurality of first management data are stored in said memory section and show sizes of free regions of said plurality of priority buffer regions, and
said (b) writing comprises:
(b1) said transmission processor updating said transmission side first management data after said writing of said message.

9. The computer-readable medium according to claim 8, wherein said memory section comprises a plurality of first buffer regions corresponding to a plurality of said transmission processors,
said plurality of priority buffer regions are provided for each of said plurality of first buffer regions, and
said (a1) reading out comprises:
(a11) said transmission processor reading out said transmission side first management data stored in a transmission side first buffer region as one of said plurality of first buffer regions which corresponds to said transmission processor.

10. The computer-readable medium according to claim 9, wherein each of said plurality of first buffer regions comprises a plurality of second buffer regions corresponding to reception processors, and
said (a11) reading out comprises:
(a111) said transmission processor reading out said transmission side first management data stored in a reception side second buffer region as one of said plurality of second buffer regions which corresponds to one of said reception processors.

11. The computer-readable medium according to claim 8, wherein said message transferring method further comprises:
(d) a reception processor of receiving said message checking whether or not there is said transmission message in one of said plurality of priority buffer regions which corresponds to a predetermined priority level;
(e) said reception processor reading out said transmission message when there is said transmission message; and
(f) repeating said (d) checking and said (e) reading out over all of said plurality of priority buffer regions.

12. The computer-readable medium according to claim 11, wherein said (d) checking comprises:
(d1) said reception processor reading out a transmission side second management data as one of a plurality of second management data which corresponds to said predetermined priority level, wherein said plurality of second management data are stored in said memory section and show that said transmission message is stored in said plurality of priority buffer regions, and
said (e) reading out comprises:
(e1) said reception processor rewriting said transmission side second management data after said reading out of said transmission message.

13. The computer-readable medium according to claim 12, wherein said memory section comprises a plurality of first buffer regions corresponding to a plurality of said transmission processors, said plurality of priority buffer regions are provided for each of said plurality of first buffer regions, and said (d1) reading out step comprises:

(d11) said reception processor reading out said transmission side second management data stored in a transmission side first buffer region as one of said plurality of first buffer regions which corresponds to said transmission processor.

* * * * *